US012320618B2

United States Patent
Yu

(10) Patent No.: US 12,320,618 B2
(45) Date of Patent: Jun. 3, 2025

(54) ZOOM SIGHT

(71) Applicant: ZHUHAI RONGSHENG TECHNOLOGY CO. LTD, Zhuhai (CN)

(72) Inventor: Guomin Yu, Zhuhai (CN)

(73) Assignee: ZHUHAI RONGSHENG TECHNOLOGY CO. LTD, Zhuhai (CN)

( * ) Notice: Subject to any disclaimer, the term of this patent is extended or adjusted under 35 U.S.C. 154(b) by 0 days.

(21) Appl. No.: 18/625,260

(22) Filed: Apr. 3, 2024

(65) Prior Publication Data

US 2024/0263918 A1 Aug. 8, 2024

Related U.S. Application Data

(63) Continuation of application No. PCT/CN2023/091811, filed on Apr. 28, 2023.

(30) Foreign Application Priority Data

Dec. 20, 2022 (CN) ......................... 202211643627.X

(51) Int. Cl.
F41G 1/38 (2006.01)
(52) U.S. Cl.
CPC ...................................... *F41G 1/38* (2013.01)
(58) Field of Classification Search
CPC .......................................................... F41G 1/38
See application file for complete search history.

(56) References Cited

U.S. PATENT DOCUMENTS

| 3,058,391 A * | 10/1962 | Leupold | G02B 15/04 |
| | | | 359/422 |
| 4,789,231 A * | 12/1988 | Shimizu | G02B 27/32 |
| | | | 359/422 |
| 5,180,875 A * | 1/1993 | Berry, Jr. | F41G 1/38 |
| | | | 359/422 |
| 7,944,611 B1 * | 5/2011 | Regan | F41G 1/38 |
| | | | 359/422 |
| 8,314,994 B1 * | 11/2012 | Thomas | G02B 23/145 |
| | | | 359/694 |

(Continued)

FOREIGN PATENT DOCUMENTS

| CN | 201576128 U | 9/2010 |
| CN | 207317634 U | 5/2018 |

(Continued)

*Primary Examiner* — Michelle Clement
(74) *Attorney, Agent, or Firm* — Bayramoglu Law Offices LLC

(57) ABSTRACT

A zoom sight includes a sight body, an inner tube, a zoom lens set, an eyepiece set, and a drive member. The inner tube is provided in the sight body, and capable of making circumferential rotation around a central axis of the inner tube; an axial position of the inner tube relative to the sight body is stable; the zoom lens set is provided in the inner tube, and linked with the inner tube; the inner tube in the circumferential rotation drives the zoom lens set to move along an axial direction of the inner tube; the eyepiece set is provided at an end of the sight body close to an eye side; the drive member is connected between the inner tube and the eyepiece set; and the drive member, the eyepiece set, and the inner tube maintain synchronous circumferential rotation.

13 Claims, 9 Drawing Sheets

(56) References Cited

U.S. PATENT DOCUMENTS

| | | | | |
|---|---|---|---|---|
| 8,584,394 | B1* | 11/2013 | Thomas | G02B 23/145 |
| | | | | 42/122 |
| 11,313,648 | B2* | 4/2022 | Walker | G02B 7/16 |
| 11,692,792 | B2* | 7/2023 | Jahromi | G02B 23/02 |
| | | | | 359/399 |
| 2006/0107580 | A1 | 5/2006 | Thomas et al. | |
| 2006/0254115 | A1 | 11/2006 | Thomas et al. | |
| 2010/0033844 | A1 | 2/2010 | Katano | |
| 2019/0277600 | A1 | 9/2019 | Larsson et al. | |

FOREIGN PATENT DOCUMENTS

| | | |
|---|---|---|
| CN | 108168370 A | 6/2018 |
| CN | 209706644 U | 11/2019 |
| CN | 214747516 U | 11/2021 |
| CN | 215373710 U | 12/2021 |
| CN | 216409928 U | 4/2022 |
| TW | M619604 U | 11/2021 |

* cited by examiner

ZOOM SIGHT

CROSS REFERENCE TO RELATED APPLICATIONS

This application is a continuation application of International Application No. PCT/CN2023/091811, filed on Apr. 28, 2023, which is based upon and claims foreign priority to Chinese Patent Application No. 202211643627.X, filed on Dec. 20, 2022, the entire contents of which are incorporated herein by reference.

TECHNICAL FIELD

The present application belongs to the technical field of sights, and particularly relates to a zoom sight.

BACKGROUND

A zoom sight usually includes a sight body, an inner tube provided in the sight body and capable of rotating around a central axis of the inner tube, and a zoom lens set provided in the inner tube. A zoom groove extending along a circumferential direction of the sight body is formed in the sight body. The inner tube is provided with a zoom pin slidably connected to the zoom groove. The zoom lens set is linked with the inner tube. The inner tube when rotated can drive the zoom lens set to move along an axial direction of the inner tube. On this basis, the zoom pin is driven to slide along the zoom groove to drive the inner tube to rotate, so as to drive the zoom lens set to move along the axial direction of the inner tube, thereby adjusting a zoom ratio of the zoom sight. However, local strength of the sight body will be weakened because of the zoom groove, such that the sight body is prone to deformation or even breakage at the zoom groove and near the zoom groove upon an impact, and the zoom sight has a poor service life.

SUMMARY

An embodiment of the present application is intended to provide a zoom sight, to solve the problem that since a local strength of a sight body will be weakened for a zoom groove, the sight body is prone to deformation or even breakage at the zoom groove and near the zoom groove upon an impact, and the zoom sight has a poor service life in the prior art.

To achieve the above objective, the present application uses the following technical solutions: A zoom sight includes:
- a sight body;
- an inner tube provided in the sight body, and capable of making circumferential rotation around a central axis of the inner tube, an axial position of the inner tube relative to the sight body being stable;
- a zoom lens set provided in the inner tube, and linked with the inner tube, where the inner tube in the circumferential rotation drives the zoom lens set to move along an axial direction of the inner tube;
- an eyepiece set provided at an end of the sight body close to an eye side; and
- a drive member connected between the inner tube and the eyepiece set, the drive member, the eyepiece set, and the inner tube maintain synchronous circumferential rotation.

In some embodiments, the zoom sight further includes an outer tube; the outer tube is provided in the sight body and outside the inner tube; and the outer tube has a stable axial position relative to the sight body, and is forbidden to make circumferential rotation around a central axis of the outer tube;
- a wall of one of the outer tube and the inner tube is provided with a curved groove extending spirally and penetrating through the wall; and a wall of the other of the outer tube and the inner tube is provided with a linear groove extending along an axial direction of the wall and penetrating through the wall; and
- the zoom lens set is provided with a slider; and the slider is slidably connected to the curved groove and the linear groove.

In some embodiments, the outer tube is fixedly connected to the sight body.

In some embodiments, the zoom sight further includes a first retaining ring provided in the sight body and connected to the sight body; and the first retaining ring is retained at a side of an end of the inner tube close to the eye side.

In some embodiments, a ball head is provided convexly at a circumferential side of an end of the outer tube close to the eye side; a ball socket is provided concavely on an inner wall of the sight body; and the ball head is hinged to the ball socket; and
- the zoom sight further includes an adjustment mechanism provided at an end of the outer tube away from the eye side; and the adjustment mechanism is configured to drive the outer tube to rotate around a center of the ball socket.

In some embodiments, a flange is provided convexly at a circumferential side of the end of the inner tube close to the eye side; and the flange and the ball head are spliced into an intact ball head structure, and collectively hinged to the ball socket.

In some embodiments, the zoom sight further includes a compression ring provided in the sight body and connected to the sight body; and the compression ring compresses the flange, to prevent the flange and the ball head from being separated from the ball socket.

In some embodiments, an end of the inner tube close to the eye side does not protrude out of the outer tube; and the ball head is an intact ball head structure, and is independently hinged to the ball socket.

In some embodiments, the zoom sight further includes a compression ring provided in the sight body and connected to the sight body, and a second retaining ring provided in the outer tube and connected to the outer tube; the compression ring compresses the ball head, to prevent the ball head from being separated from the ball socket; and the second retaining ring is retained at a side of the end of the inner tube close to the eye side.

In some embodiments, a rotation stopping groove extending along an axial direction of the outer tube is formed in an outer circumferential surface of the ball head; a second threaded hole extending along a radial direction of the sight body and communicating with the rotation stopping groove is formed in the sight body; the zoom sight further includes a rotation stopping bolt provided in the second threaded hole; and a nail portion of the rotation stopping bolt is stretched out of the second threaded hole and limited in the rotation stopping groove, so as to forbid the circumferential rotation of the outer tube around the central axis of the outer tube.

In some embodiments, the nail portion of the rotation stopping bolt abuts against two opposite walls of the rotation stopping groove.

In some embodiments, the outer tube has a radial plane passing through the center of the ball socket and perpendicular to a central axis of the sight body; and a contact point or a contact line between the nail portion of the rotation stopping bolt and each of the walls of the rotation stopping groove is located on the radial plane.

In some embodiments, the end of the outer tube away from the eye side is provided with a retaining portion; and the retaining portion is retained at a side of an end of the inner tube away from the eye side.

In some embodiments, the drive member is provided with a drive barrel nested in the inner tube; a protrusion is provided convexly on an outer surface of the drive barrel; an inner tube wall of the inner tube is provided with an axially extending limit groove; an end of the limit groove close to the eye side communicates with the outside of the inner tube; and the protrusion is limited in the limit groove.

In some embodiments, the protrusion abuts against two opposite walls of the limit groove.

In some embodiments, the drive member is provided with a drive barrel nested in the inner tube; a protrusion is provided convexly on an outer surface of the drive barrel; an inner tube wall of the inner tube is provided with an axially extending limit groove; an end of the limit groove close to the eye side communicates with the outside of the inner tube; the protrusion is limited in the limit groove; and the protrusion abuts against two opposite walls of the limit groove; and the outer tube has a radial plane passing through the center of the ball socket and perpendicular to a central axis of the sight body; and a contact point or a contact line between the protrusion and each of the walls of the limit groove is located on the radial plane.

In some embodiments, the zoom sight further includes a locking pressure ring connected to the end of the sight body close to the eye side; and the locking pressure ring presses the drive member to a side of the end of the sight body close to the eye side, such that an axial position of the drive member relative to the sight body is stable.

In some embodiments, the eyepiece set includes a barrel connected to the drive member; the barrel is sleeved on an outer side of the drive member; an outer surface of the barrel is provided with a radially penetrating first threaded hole; the zoom sight further includes a synchronization bolt provided in the first threaded hole; and the synchronization bolt abuts against the drive member, such that the barrel and the drive member maintain synchronous circumferential rotation.

The zoom sight provided by the present application has the following beneficial effects: According to the zoom sight provided by the embodiment of the present application, the drive member is connected to the eyepiece set and the inner tube, such that the eyepiece set, the drive member, and the inner tube maintain synchronous circumferential rotation. Upon this, when a zoom ratio of the zoom sight is to be adjusted, the eyepiece set located in an external environment and provided close to a user can be held by the user, and the eyepiece set can be rotated circumferentially, thereby driving the drive member and the inner tube to make synchronous circumferential rotation. The inner tube in the circumferential rotation drives the zoom lens set to move along the axial direction of the inner tube, thereby adjusting the zoom ratio of the zoom sight. The zoom operation is easy, convenient and quick. Compared with the existing zoom sight, the present application removes such structures as a zoom pin, and a zoom groove on the sight body, can effectively ensure and improve a structural strength of the sight body, reduce deformation or even breakage of the sight body upon an impact due to a weakened local strength of the sight body, make the sight body not prone to the deformation and the breakage, and ensure and prolong a service life of the zoom sight.

BRIEF DESCRIPTION OF THE DRAWINGS

To describe the technical solutions in the embodiments of the present application more clearly, the drawings required for describing the embodiments or the prior art are described briefly below. Apparently, the drawings in the following description merely show some embodiments of the present application, and those of ordinary skill in the art may still derive other drawings from these drawings without creative efforts.

In the figures.

Figure 1:
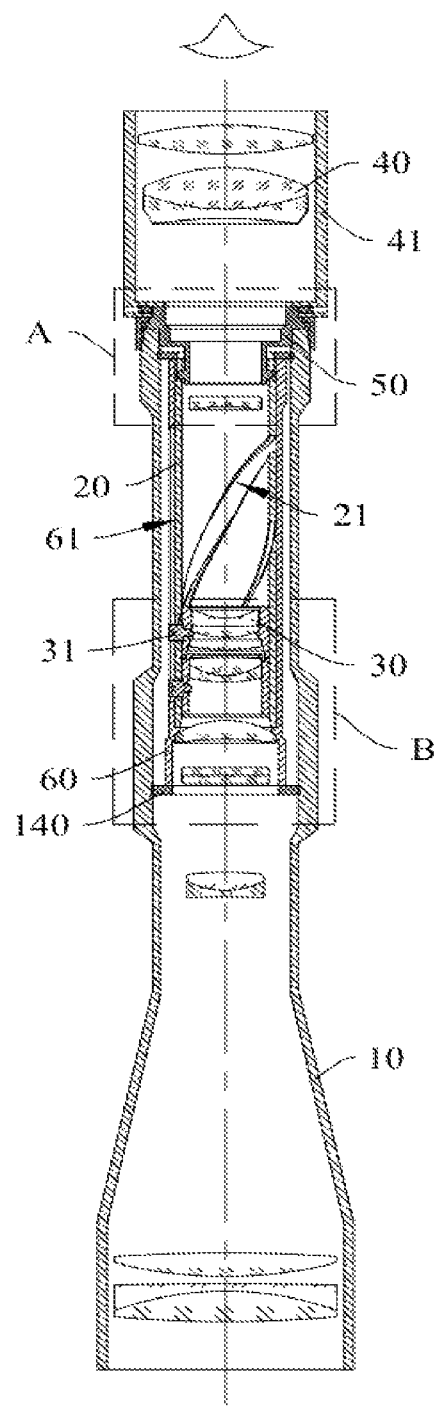
FIG. 1 is a structural schematic view of a zoom sight according to Embodiment 1 of the present application.

10—sight body, 11—ball socket, 12—second threaded hole, 20—inner tube, 21—curved groove, 22—flange, 23—limit groove, 30—zoom lens set, 31—slider, 32—lens holder, 33—lens, 40—eyepiece set, 41—barrel, 411—first threaded hole, 50—drive member, 51—drive barrel, 511—protrusion, 60—outer tube, 61—linear groove, 62—ball head, 621—rotation stopping groove, 63—radial plane, 64—retaining portion, 70—first retaining ring, 80—adjustment mechanism, 81—ballistic adjustment assembly, 82—windage adjustment assembly, 83—restoration structure, 90—compression ring, 100—second retaining ring, 110—rotation stopping bolt, 120—locking pressure ring, 130—synchronization bolt, and 140—third retaining ring.

DETAILED DESCRIPTION OF THE EMBODIMENTS

To make the to-be-resolved technical problems, technical solutions and beneficial effects of the present application clearer, the present application is described in further detail below with reference to the drawings and embodiments. It should be understood that the specific embodiments described herein are merely intended to explain the present application, rather than to limit the present application.

In the description of the present application, it needs to be understood the orientation or positional relationships indicated by terms, such as "length", "width", "upper", "lower", "front", "rear", "left", "right", "vertical", "horizontal", "top", "bottom", "inside", and "outside", are based on the orientation or positional relationship shown in the accompanying drawings, are merely for facilitating the description of the present application and simplifying the description, rather than indicating or implying that an apparatus or element referred to must have a particular orientation or be constructed and operated in a particular orientation, and therefore shall not be interpreted as limiting the present application.

In addition, the terms "first" and "second" are merely intended for a purpose of description, and shall not be understood as an indication or implication of relative importance or implicit indication of a quantity of indicated technical features. Thus, features defined with "first" and "second" may explicitly or implicitly include one or more of the features. In the description of the present application, "multiple" means two or more, unless otherwise specifically defined.

In the present application, unless otherwise clearly specified, the terms such as "mounting", "interconnection", "connection" and "fixation" are intended to be understood in a broad sense. For example, the "connection" may be a fixed connection, removable connection or integral connection; may be a mechanical connection or electrical connection; may be a direct connection or indirect connection via a medium; and may be a communication or interaction between two elements. Those of ordinary skill in the art may understand specific meanings of the above terms in the present application based on specific situations.

In the present application, the term "eye side" refers to an end of the zoom sight close to a shooter in an actual operation, and the term "object side" refers to an end of the zoom sight close to a target in the actual operation, namely an end away from the shooter.

In a related art, a zoom sight usually includes a sight body, an inner tube provided in the sight body and capable of rotating around a central axis of the inner tube, and a zoom lens set provided in the inner tube. A zoom groove extending along a circumferential direction of the sight body is formed in the sight body. The inner tube is provided with a zoom pin slidably connected to the zoom groove. The zoom lens set is linked with the inner tube. The inner tube in rotation can drive the zoom lens set to move along an axial direction of the inner tube. By driving the zoom pin to slide along the zoom groove, the inner tube is driven to rotate. Consequently, the zoom lens set is driven to move along the axial direction of the inner tube, thereby adjusting a zoom ratio of the zoom sight. However, a local strength of the sight body will be weakened for the zoom groove, such that the sight body is prone to deformation or even breakage at the zoom groove and near the zoom groove upon an impact, and the zoom sight has a poor service life. Particularly, an extension amplitude of the zoom groove is positively correlated with a zoom ratio adjustment range of the zoom sight. While the extension amplitude of the zoom groove is expanded, the local strength of the sight body in the zoom groove and near the zoom groove is gradually weakened, and the sight body is more prone to the deformation or even the breakage in the zoom groove and near the zoom groove upon the impact.

Therefore, an embodiment of the present application provides a zoom sight. Compared with the existing zoom sight, the present application removes such structures as a zoom pin, and a zoom groove on the sight body, can effectively ensure and improve a structural strength of the sight body, reduce deformation or even breakage of the sight body upon an impact due to a weakened local strength of the sight body, make the sight body not prone to the deformation and the breakage, and ensure and prolong a service life of the zoom sight.

The specific implementation of the present application is described in detail below with reference to specific embodiments.

Embodiment 1

Figure 2:
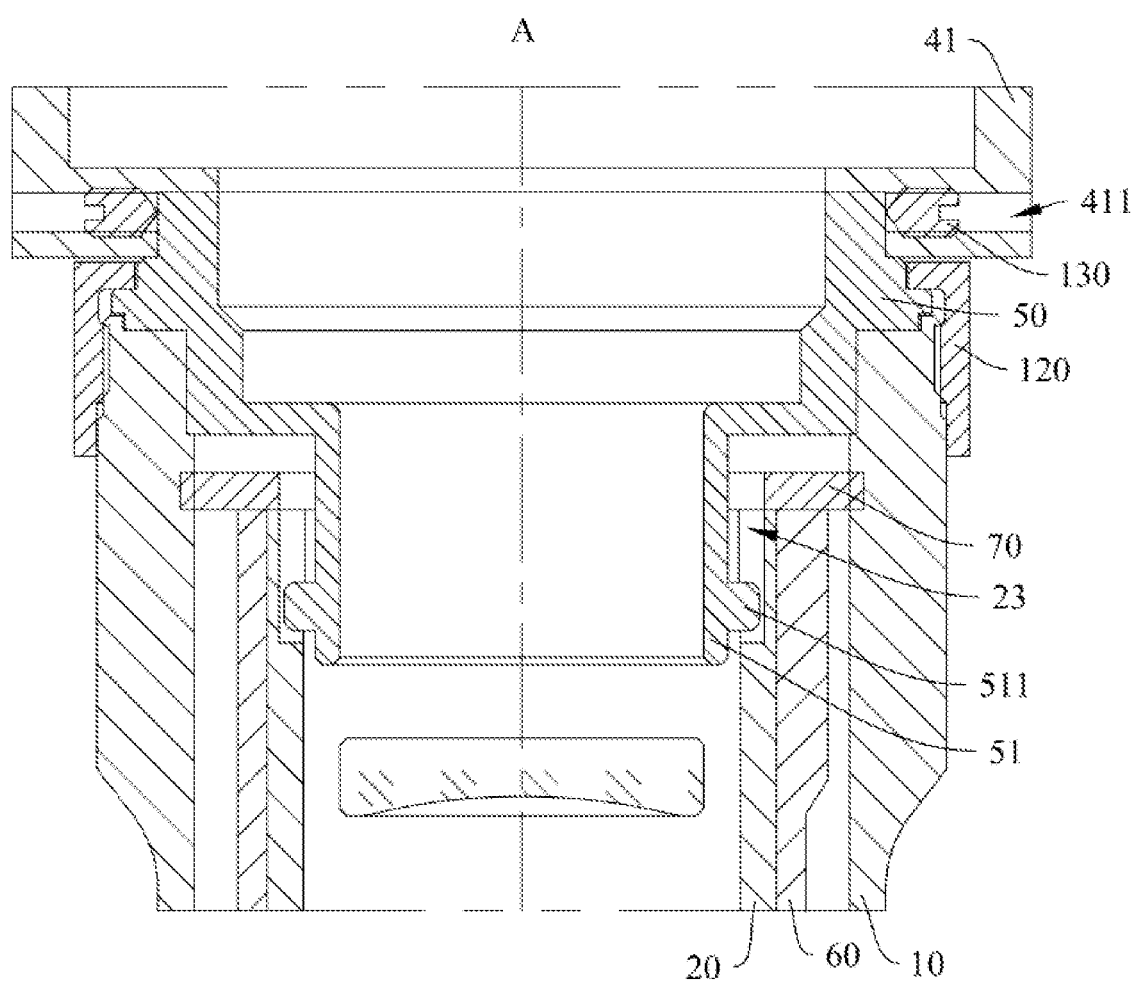
FIG. 2 is an enlarged view of A shown in FIG. 1.
Figure 3:
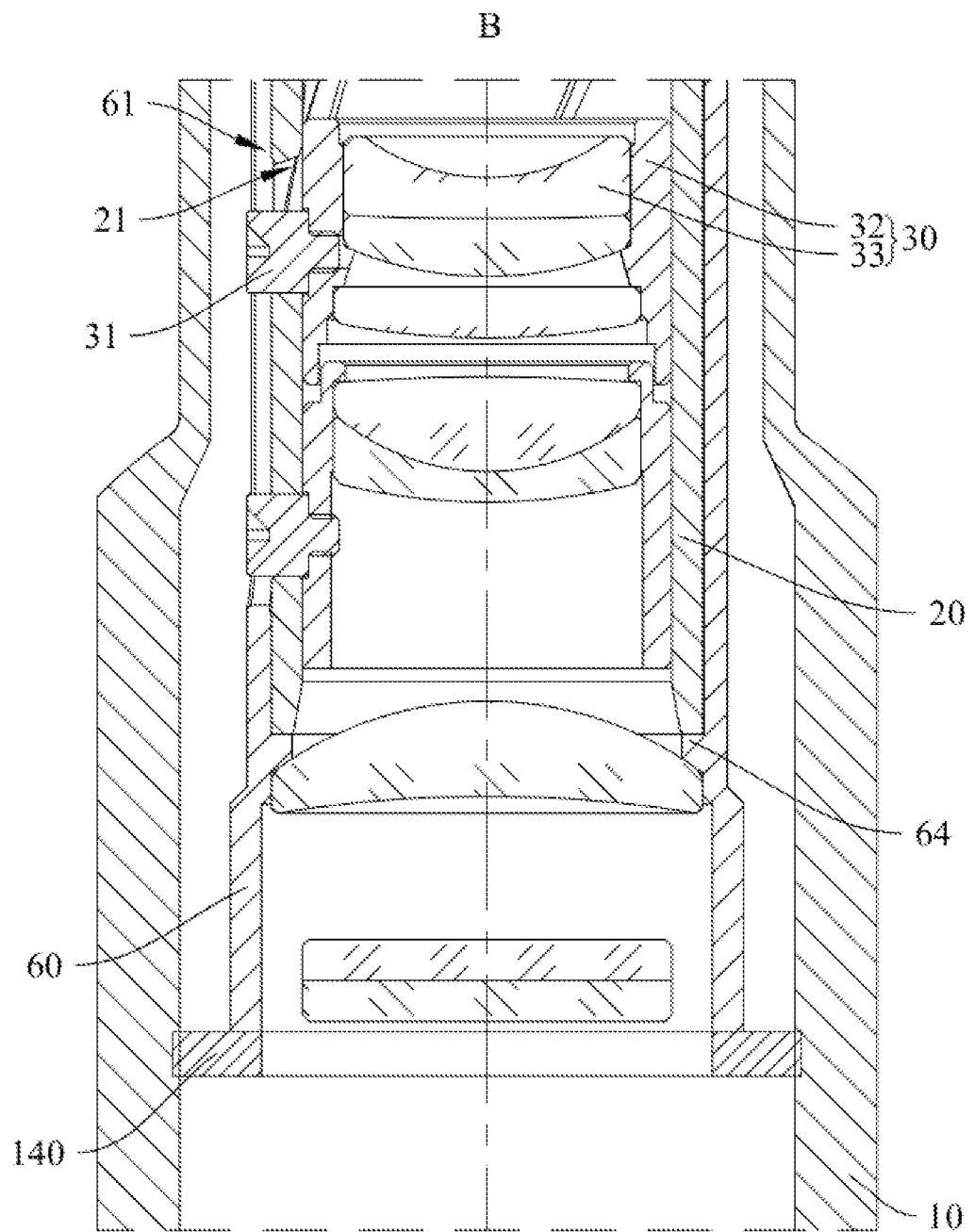
FIG. 3 is an enlarged view of B shown in FIG. 1.

Referring to FIG. 1, FIG. 2, and FIG. 3, an embodiment of the present application provides a zoom sight, including sight body 10, inner tube 20, zoom lens set 30, eyepiece set 40, and drive member 50. The inner tube 20 is provided in the sight body 10, and capable of making circumferential rotation around a central axis of the inner tube. An axial position of the inner tube 20 relative to the sight body 10 is stable. The zoom lens set 30 is provided in the inner tube 20, and linked with the inner tube 20. The inner tube 20 in the circumferential rotation drives the zoom lens set 30 to move along an axial direction of the inner tube 20. The eyepiece set 40 is provided at an end of the sight body 10 close to an eye side. The drive member 50 is connected between the inner tube 20 and the eyepiece set 40. The drive member 50, the eyepiece set 40, and the inner tube 20 maintain synchronous circumferential rotation.

It is to be noted that the inner tube 20 is provided in the sight body 10, and the sight body 10 can protect structures such as the inner tube 20 therein reliably. The axial position of the inner tube 20 relative to the sight body 10 is stable, namely the inner tube 20 is forbidden to move along an axial direction of the sight body 10. However, the inner tube 20 can make the circumferential rotation around the central axis of the inner tube 20.

The zoom lens set 30 is provided in the inner tube 20 to take a zooming effect. The zoom lens set 30 is linked with the inner tube 20, such that the zoom lens set 30 can move along the axial direction of the inner tube 20 under driving of the circumferential rotation of the inner tube 20. By adjusting an axial position of the zoom lens set 30 relative to the inner tube 20, a zoom ratio of the zoom sight can be adjusted. The zoom lens set 30 includes lens holder 32 movably provided in the inner tube 20, and at least one lens 33 provided in the lens holder 32.

The eyepiece set 40 is provided at the end of the sight body 10 close to the eye side, and configured to amplify a final image and transmit a resulting image to a human eye. There are no limits made on a specific structure of the eyepiece set 40 in the embodiment.

The drive member 50 is provided between the inner tube 20 and the eyepiece set 40. One end of the drive member 50 is connected to an end of the inner tube 20 close to the eye side in a manner including but not limited to fixed connection or detachable connection. For example, threaded connection, clamping groove fit and the like can be used, and are not limited in the embodiment. The other end of the drive member 50 is connected to the eyepiece set 40. Preferably, the drive member 50 and the eyepiece set 40 are detachably connected, for example, through bolt fastening and the like. Certainly, fixed connection may also be used, and is not limited in the embodiment.

Upon this, based on a connection relation between the eyepiece set 40, the drive member 50 and the inner tube 20 in sequence, the drive member 50, the eyepiece set 40, and the inner tube 20 maintain synchronous circumferential rotation. Therefore, when the zoom ratio of the zoom sight is to be adjusted, the eyepiece set 40 located in an external environment and provided close to a user can be held by the user, and the eyepiece set 40 can be rotated circumferentially, thereby driving the drive member 50 and the inner tube 20 to make synchronous circumferential rotation. The inner tube 20 in the circumferential rotation drives the zoom lens set 30 to move along the axial direction of the inner tube 20, thereby adjusting the zoom ratio of the zoom sight. The zoom operation is easy, convenient and quick. Compared with the existing zoom sight, the present application removes such structures as a zoom pin, and a zoom groove on the sight body 10, can effectively ensure and improve a structural strength of the sight body 10, can effectively reduce deformation or even breakage of the sight body 10 upon an impact due to a weakened local strength of the sight body 10, can make the sight body 10 not prone to the deformation and the breakage, and can effectively ensure and prolong a service life of the zoom sight.

Moreover, upon the above structure, the zoom sight can form a light channel that sequentially passes through the zoom lens set 30, the drive member 50, and the eyepiece set 40 from an object side and gets to the eye side. Sequentially passing through the zoom lens set 30, the drive member 50, and the eyepiece set 40 along the light channel, visible light can enter the human eye. This can effectively ensure aiming performance of the zoom sight, and does not affect the aiming performance of the zoom sight even in the zoom operation.

In the embodiment, by directly taking the eyepiece set 40 as a zoom adjustment structure to be held and circumferentially rotated by the user, but not providing an adjustment ring additionally, the present application can effectively save a number of structural parts of the zoom sight, can effectively simplify a structure of the zoom sight, and can effectively save a cost of the zoom sight.

To sum up, according to the zoom sight provided by the embodiment of the present application, the drive member 50 is connected to the eyepiece set 40 and the inner tube 20, such that the eyepiece set 40, the drive member 50, and the inner tube 20 maintain the synchronous circumferential rotation. Upon this, when a zoom ratio of the zoom sight is to be adjusted, the eyepiece set 40 located in an external environment and provided close to a user can be held by the user, and the eyepiece set 40 can be rotated circumferentially, thereby driving the drive member 50 and the inner tube 20 to make synchronous circumferential rotation. The inner tube 20 in the circumferential rotation drives the zoom lens set 30 to move along the axial direction of the inner tube 20, thereby adjusting the zoom ratio of the zoom sight. The zoom operation is easy, convenient and quick. Compared with the existing zoom sight, the present application removes such structures as a zoom pin, and a zoom groove on the sight body 10, can effectively ensure and improve a structural strength of the sight body 10, can effectively reduce deformation or even breakage of the sight body 10 upon an impact due to a weakened local strength of the sight body 10, can make the sight body 10 not prone to the deformation and the breakage, and can effectively ensure and prolong a service life of the zoom sight.

Referring to FIG. 1, FIG. 2, and FIG. 3, in some embodiments of the present application, the zoom sight further includes outer tube 60. The outer tube 60 is provided in the sight body 10 and outside the inner tube 20. The outer tube 60 has a stable axial position relative to the sight body 10, and is forbidden to make circumferential rotation around a central axis of the outer tube. A wall of one of the outer tube 60 and the inner tube 20 is provided with curved groove 21 extending spirally and penetrating through the wall. A wall of the other of the outer tube and the inner tube is provided with linear groove 61 extending along an axial direction of the wall and penetrating through the wall. The zoom lens set 30 is provided with slider 31. The slider 31 is slidably connected to the curved groove 21 and the linear groove 61.

It is to be noted that the outer tube 60 is provided in the sight body 10, and is reliably protected by the sight body 10. The outer tube 60 has the stable axial position relative to the sight body 10, namely the outer tube 60 is forbidden to move along the axial direction of the sight body 10. The outer tube 60 is further forbidden to make the circumferential rotation around the central axis of the outer tube 60.

The inner tube 20 is provided in the outer tube 60. In the outer tube 60, the inner tube 20 is forbidden to move axially, but can make the circumferential rotation around the central axis of the inner tube 20.

In a possible implementation, a wall of the outer tube 60 is provided with the curved groove 21, while a wall of the inner tube 20 is provided with the linear groove 61. In another possible implementation, a wall of the outer tube 60 is provided with the linear groove 61, while a wall of the inner tube 20 is provided with the curved groove 21.

The slider 31 is provided at an outer side of the zoom lens set 30. The slider 31 can be provided on the lens holder 32 of the zoom lens set 30. The slider 31 may be, but is not limited to, a sliding pin. The slider 31 is slidably connected to the curved groove 21 and the linear groove 61, namely the slider 31 is located at an intersection between the curved groove 21 and the linear groove 61.

Upon this, through the curved groove 21 and the linear groove 61 respectively formed in the outer tube 60 and the inner tube 20, and the slider 31 slidably connected to the curved groove 21 and the linear groove 61, the zoom lens set 30 is linked with the inner tube 20 conveniently, reliably and effectively, such that the zoom lens set 30 can move along the axial direction of the inner tube 20 under driving of the circumferential rotation of the inner tube 20. Specifically, when the eyepiece set 40 is rotated circumferentially to drive the drive member 50 and the inner tube 20 to make the synchronous circumferential rotation, since the inner tube 20 makes the circumferential rotation around the central axis of the inner tube and the outer tube 60 does not make the circumferential rotation around the central axis of the outer tube, the curved groove 21 and the linear groove 61 rotate relatively, and the intersection between the curved groove 21 and the linear groove 61 changes. This drives the slider 31 slidably connected to the curved groove 21 and the linear groove 61 to move along the axial direction of the inner tube 20, and drives the zoom lens set 30 to move along the axial direction of the inner tube 20, thereby realizing the zoom operation. The zoom operation is easy, smooth, convenient and quick.

Referring to FIG. 1, FIG. 2, and FIG. 3, in some embodiments of the present application, the outer tube 60 is fixedly connected to the sight body 10.

It is to be noted that the outer tube 60 and the sight body 10 are stably connected and fixedly connected in a manner including but not limited to threaded connection and glue bonding. Referring to FIG. 1, FIG. 2, and FIG. 3, in a possible implementation, the zoom sight further includes first retaining ring 70 and third retaining ring 140 that are provided in the sight body 10 and connected to the sight body 10. The first retaining ring 70 is located and connected at a side of an end of the outer tube 60 close to the eye side. The third retaining ring 140 is located and connected at a side of an end of the outer tube 60 away from the eye side. In the implementation, there are no limits made on a connection manner of the first retaining ring 70 with the sight body 10 and the outer tube 60, and a connection manner of the third retaining ring 140 with the sight body 10 and the outer tube 60.

With the above solution, the outer tube 60 can be fixedly connected to the sight body 10, such that the axial position of the outer tube 60 relative to the sight body 10 is stabilized reliably, the outer tube 60 is forbidden reliably to move along the axial direction of the sight body 10, and the outer tube 60 is forbidden reliably to make the circumferential rotation around the central axis of the outer tube 60.

Referring to FIG. 1, FIG. 2, and FIG. 3, in some embodiments of the present application, the zoom sight further includes first retaining ring 70 provided in the sight body 10 and connected to the sight body 10. The first retaining ring 70 is retained at a side of the end of the inner tube 20 close to the eye side. There are no limits made on a connection manner between the first retaining ring 70 and the sight body 10 in the embodiment.

With the above solution, the first retaining ring 70 connected to the sight body 10 locates and retains the side of the end of the inner tube 20 close to the eye side, thereby forbidding the inner tube 20 reliably to move close to the eye side. Thus, in cooperation with a limit structure at a side of an end of the inner tube 20 away from the eye side (for example, retaining portion 64 hereinafter), the first retaining ring stabilizes the axial position of the inner tube 20 relative to the outer tube 60 reliably, thereby forbidding the inner tube 20 reliably to move along the axial direction of the outer tube 60. Moreover, location and retention of the first retaining ring 70 for the side of the end of the inner tube 20 close to the eye side does not affect the circumferential rotation of the inner tube 20 around the central axis of the inner tube.

Certainly, in other possible implementations, without affecting the circumferential rotation of the inner tube 20 around the central axis of the inner tube, other limit structures may also be used to limit and locate the side of the end of the inner tube 20 close to the eye side, and this is not limited in the embodiment.

Referring to FIG. 1, FIG. 2, and FIG. 3, in some embodiments of the present application, the end of the outer tube 60 away from the eye side is provided with retaining portion 64. The retaining portion 64 is retained at the side of the end of the inner tube 20 away from the eye side. The retaining portion 64 protrudes inward from an inner tube 20 wall of the outer tube 60.

With the above solution, the end of the outer tube 60 away from the eye side protrudes inward to form the retaining portion 64. The retaining portion 64 locates and retains the side of the end of the inner tube 20 away from the eye side, thereby forbidding the inner tube 20 reliably to move away from the eye side. Thus, in cooperation with a limit structure at the side of the end of the inner tube 20 close to the eye side (for example, the first retaining ring 70 described above), the retaining portion stabilizes the axial position of the inner tube 20 relative to the outer tube 60 reliably, thereby forbidding the inner tube 20 reliably to move along the axial direction of the outer tube 60. Moreover, location and retention of the retaining portion 64 for the side of the end of the inner tube 20 away from the eye side does not affect the circumferential rotation of the inner tube 20 around the central axis of the inner tube.

Certainly, in other possible implementations, without affecting the circumferential rotation of the inner tube 20 around the central axis of the inner tube, other limit structures may also be used to limit and locate the side of the end of the inner tube 20 away from the eye side. For example, referring to the first retaining ring 70, a retaining ring may also be provided at the side of the end of the inner tube 20 away from the eye side to limit and locate the side of the end of the inner tube 20 away from the eye side. This is not limited in the embodiment.

Compared with other implementations, the retaining portion 64 for locating and retaining the side of the end of the inner tube 20 away from the eye side is provided directly and convexly at the end of the outer tube 60 away from the eye side in the embodiment. This can effectively reduce a number of structural parts, can effectively omit an assembly process, and can effectively ensure and improve an assembly convenience and an assembly efficiency of the zoom sight.

Figure 4:
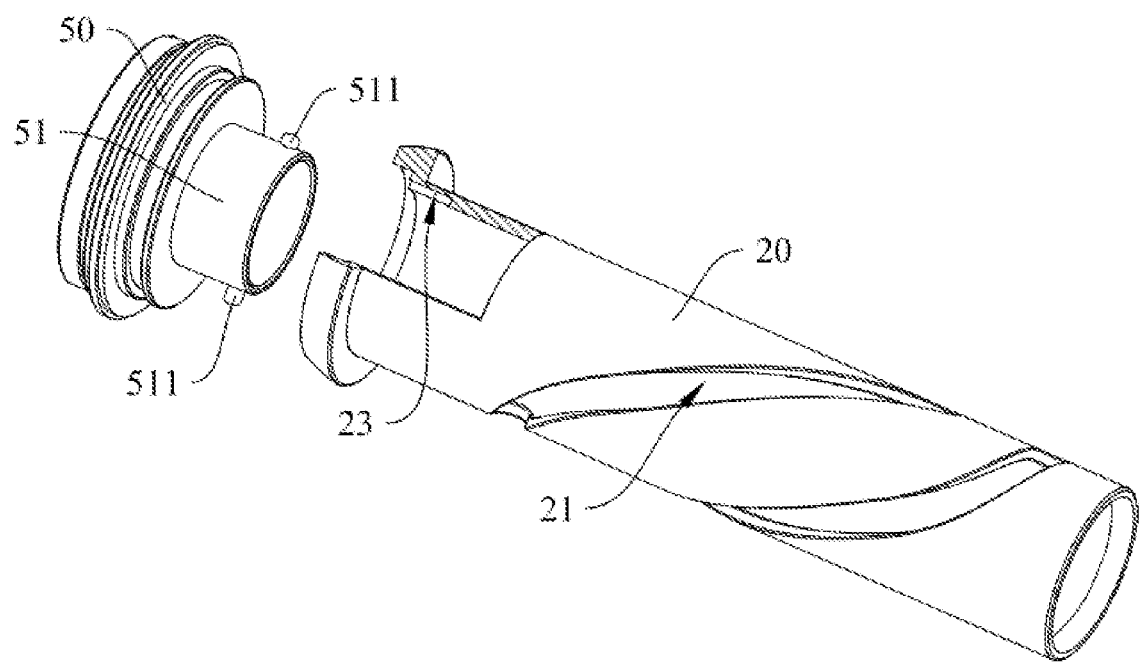
FIG. 4 is an exploded schematic view of a drive member and an inner tube according to Embodiment 1 of the present application.

Referring to FIG. 1, FIG. 2, and FIG. 4, in some embodiments of the present application, the drive member 50 is provided with drive barrel 51 nested in the inner tube 20. Protrusion 511 is provided convexly on an outer surface of the drive barrel 51. Inner tube 20 wall of the inner tube 20 is provided with axially extending limit groove 23. An end of the limit groove 23 close to the eye side communicates with the outside of the inner tube 20. The protrusion 511 is limited in the limit groove 23.

It is to be noted that an end of the drive member 50 connected to the inner tube 20 is provided with the drive barrel 51, and the drive barrel 51 can be nested in the end of the inner tube 20 close to the eye side. The protrusion 511 is provided convexly on the outer surface of the drive barrel 51, and the inner tube 20 wall of the inner tube 20 is correspondingly provided with the limit groove 23. When the drive barrel 51 is nested in the inner tube 20, the protrusion 511 can slide to the limit groove 23 from the end of the limit groove 23 close to the eye side, and is finally limited in the limit groove 23, such that the drive member 50 can be detachably connected to the inner tube 20, and the connected drive member 50 and inner tube 20 can maintain synchronous circumferential rotation.

There may be one or more limit grooves 23 along a circumferential direction of the inner tube 20 wall of the inner tube 20. Each limit groove 23 can correspondingly limit one or more protrusions 511. This is not limited in the embodiment. Preferably, in response to a plurality of limit grooves 23, the plurality of limit grooves 23 are arrayed along the circumferential direction of the inner tube 20 wall of the inner tube 20. This can equalize and optimize a distribution at a junction between the drive barrel 51 and the inner tube 20, thereby equalizing an acting force between the drive barrel 51 and the inner tube 20, and improving a connection reliability and a connection strength between the drive barrel 51 and the inner tube 20.

The protrusion 511 may be, but is not limited to, a circular cylinder, a polygonal cylinder, and a hemispheroid. This is not limited in the embodiment.

With the above solution, the drive member 50 can be sleeved on the end of the inner tube 20 close to the eye side through the drive barrel 51, and limited with the limit groove 23 in the inner tube 20 wall of the inner tube 20 through the protrusion 511 on the outer surface of the drive barrel 51. This realizes detachable connection between the drive member 50 and the inner tube 20 conveniently, quickly and reliably, and makes the drive member 50 and the inner tube 20 maintain the synchronous circumferential rotation. Upon this, when the eyepiece set 40 is rotated circumferentially by the user to drive the drive member 50 to make the synchronous circumferential rotation, the drive member 50 can drive the inner tube 20 reliably to make the synchronous circumferential rotation through limitation between the protrusion 511 and the limit groove 23, thereby driving the zoom lens set 30 to move along the axial direction of the inner tube 20 to realize the zoom operation.

Certainly, in other possible implementations, the drive member 50 may be connected to the inner tube 20 in other manners, and this is not limited in the embodiment.

Referring to FIG. 1, FIG. 2, and FIG. 4, in some embodiments of the present application, the protrusion 511 abuts against two opposite walls of the limit groove 23.

It is to be noted that by allowing a size of the protrusion 511 in a width direction of the limit groove 23 to match with a width of the limit groove 23, the protrusion 511 can abut against the two opposite walls of the limit groove 23. The protrusion 511 and each of the walls of the limit groove 23 may be come in a point contact, a line contact or a surface contact, and this is not limited in the embodiment.

With the above solution, by allowing the protrusion 511 to abut against the two opposite walls of the limit groove 23, a fit clearance between the protrusion 511 and each of the two opposite walls of the limit groove 23 can be eliminated. Upon this, in response to the circumferential rotation of the drive member 50, the drive member 50 can directly drive the inner tube 20 to make the synchronous circumferential rotation through the limitation between the protrusion 511 and the limit groove 23, without compensating the fit clearance between the protrusion 511 and each of the two opposite walls of the limit groove 23. This can ensure and improve rotation synchronism between the drive member 50 and the inner tube 20, and can ensure and improve a zoom adjustment accuracy.

Referring to FIG. 1 and FIG. 2, in some embodiments of the present application, the zoom sight further includes locking pressure ring 120 connected to the end of the sight body 10 close to the eye side. The locking pressure ring 120 presses the drive member 50 to a side of the end of the sight body 10 close to the eye side, such that an axial position of the drive member 50 relative to the sight body 10 is stable.

It is to be noted that the locking pressure ring 120 may be connected to the end of the sight body 10 close to the eye side in a manner including but not limited to threaded connection and glue bonding, and this is not limited in the embodiment.

The locking pressure ring 120 presses and compresses the drive member 50 to the side of the end of the sight body 10 close to the eye side, such that the axial position of the drive member 50 relative to the sight body 10 is stable, thereby reliably forbidding the drive member 50 to move along the axial direction of the sight body 10. Meanwhile, the locking pressure ring 120 presses and limits the drive member 50, without affecting the synchronous circumferential rotation of the drive member 50 and the inner tube 20.

Certainly, in other possible implementations, without affecting the synchronous circumferential rotation of the drive member 50 and the inner tube 20, the drive member 50 can also be limited and located in other manners to stabilize the axial position of the drive member 50 relative to the sight body 10. This is not limited in the embodiment.

Referring to FIG. 1 and FIG. 2, in some embodiments of the present application, the eyepiece set 40 includes barrel 41 connected to the drive member 50. The barrel 41 is sleeved on an outer side of the drive member 50. An outer surface of the barrel 41 is provided with radially penetrating first threaded hole 411. The zoom sight further includes synchronization bolt 130 provided in the first threaded hole 411. The synchronization bolt 130 abuts against the drive member 50, such that the barrel 41 and the drive member 50 maintain synchronous circumferential rotation.

It is to be noted that the eyepiece set 40 includes the barrel 41, and the barrel 41 can be sleeved on an outer circumferential side of an end of the drive member 50 connected to the eyepiece set 40. The first threaded hole 411 is formed in the outer surface of the barrel 41. The first threaded hole 411 penetrates through an inner surface of the barrel 41 along the radial direction of the barrel 41. The synchronization bolt 130 can be screwed in from an outer orifice of the first threaded hole 411, until a nail portion of the synchronization bolt 130 penetrates through an inner orifice of the first threaded hole 411 and abuts against an outer circumferential surface of the drive member 50. Upon this, based on connection of the synchronization bolt 130 with the drive member 50 and the barrel 41, the barrel 41 and the drive member 50 can maintain the synchronous circumferential rotation.

There may be one or more first threaded holes 411 along a circumferential direction of the outer surface of the barrel 41. Each first threaded hole 411 is provided with one synchronization bolt 130. Preferably, in response to a plurality of first threaded holes 411, the plurality of first threaded holes 411 are arrayed along the circumferential direction of the outer surface of the barrel 41. This can equalize and optimize a distribution at a junction between the drive barrel 50 and the barrel 41, thereby equalizing an acting force between the drive member 50 and the barrel 41, and improving a connection reliability and a connection strength between the drive member 50 and the eyepiece set 40.

With the above solution, the eyepiece set 40 can be sleeved on the drive member 50 through the barrel 41, and abuts against the outer circumferential surface of the drive member 50 through the synchronization bolt 130 provided in the first threaded hole 411. This realizes detachable connection between the eyepiece set 40 and the drive member 50 conveniently, quickly and reliably. Upon this, when the eyepiece set 40 is rotated circumferentially, the eyepiece set 40 can drive the drive member 50 reliably to make the synchronous circumferential rotation through the connection between the barrel 41, the synchronization bolt 130 and the drive member 50, thereby driving the inner tube 20 to make the circumferential rotation, driving the zoom lens set 30 to move along the axial direction of the inner tube 20, and realizing the zoom operation.

Certainly, in other possible implementations, the eyepiece set 40 may be connected to the drive member 50 in other manners, and this is not limited in the embodiment.

Embodiment 2

Figure 5:
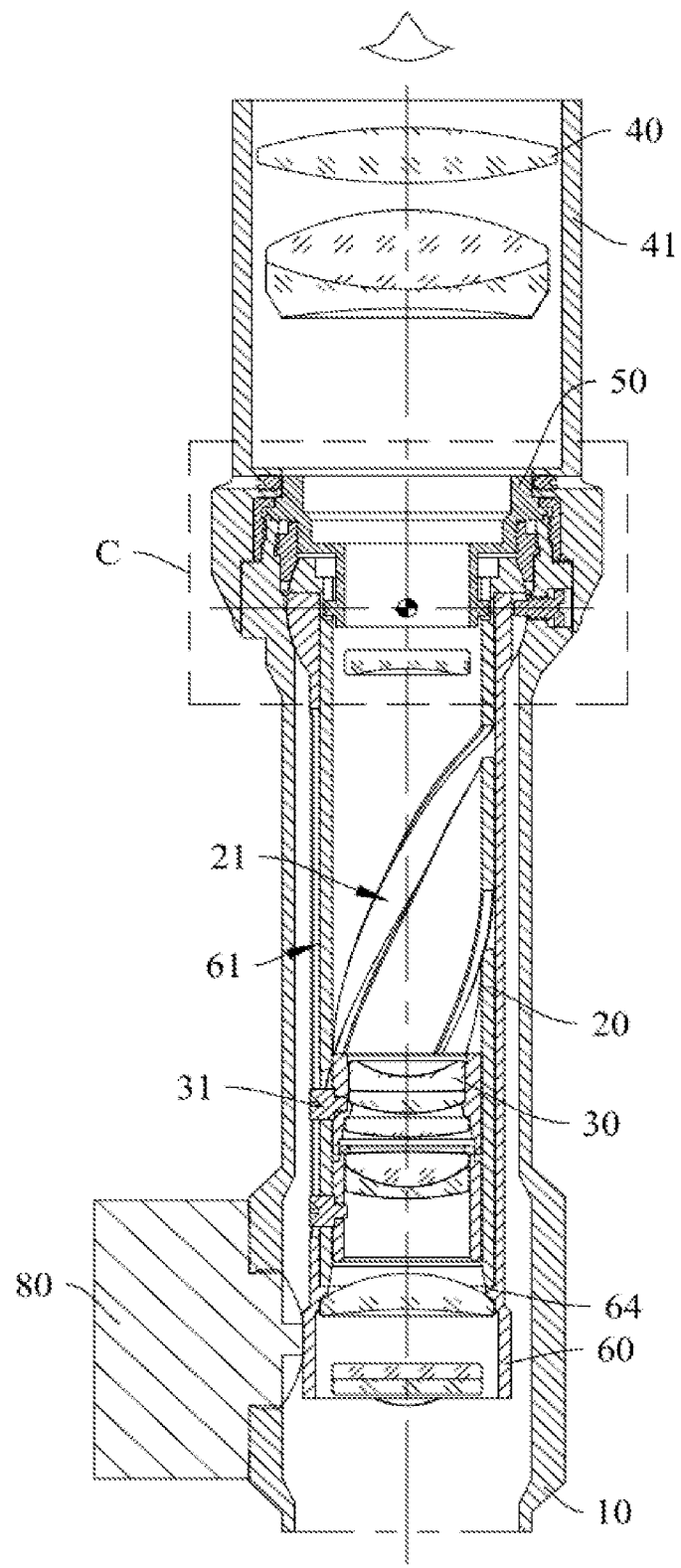
FIG. 5 is a structural schematic view of a zoom sight according to Embodiment 2 of the present application.
Figure 6:
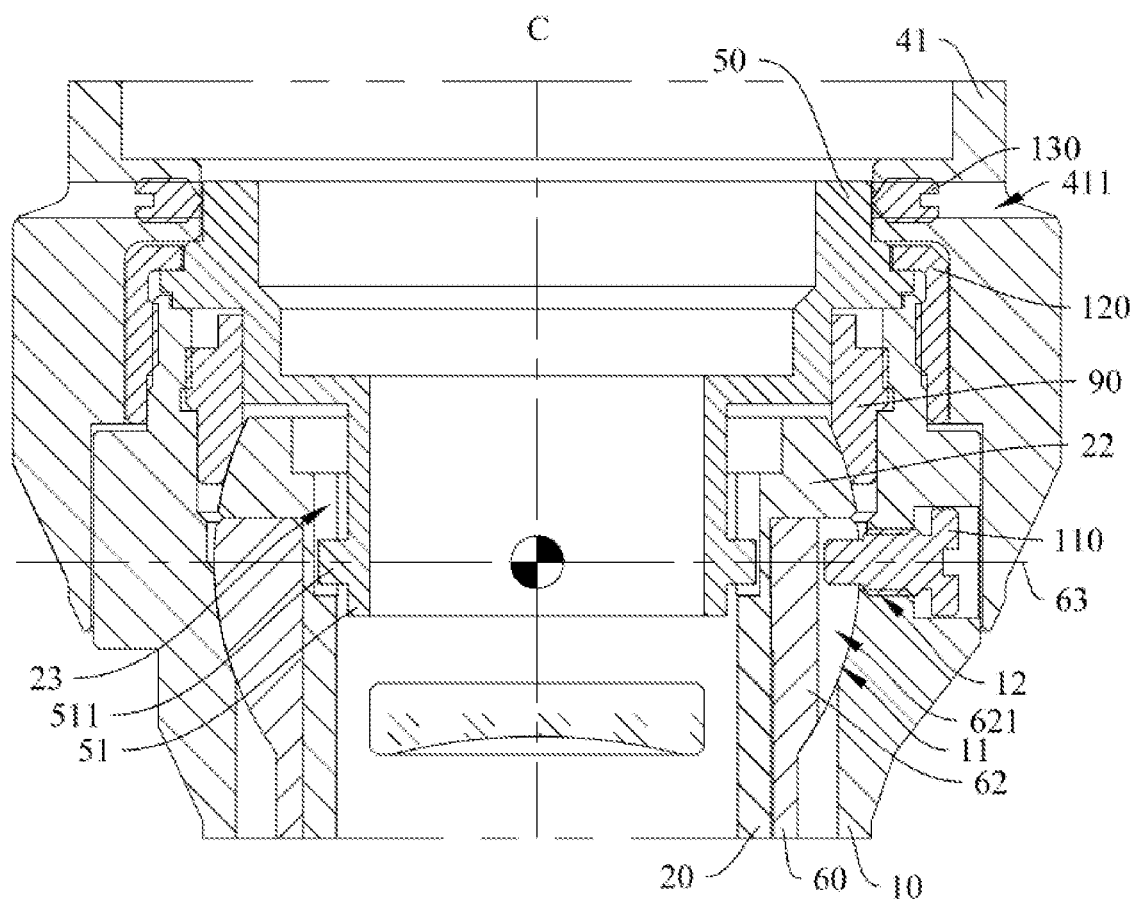
FIG. 6 is an enlarged view of C shown in FIG. 5.
Figure 8:
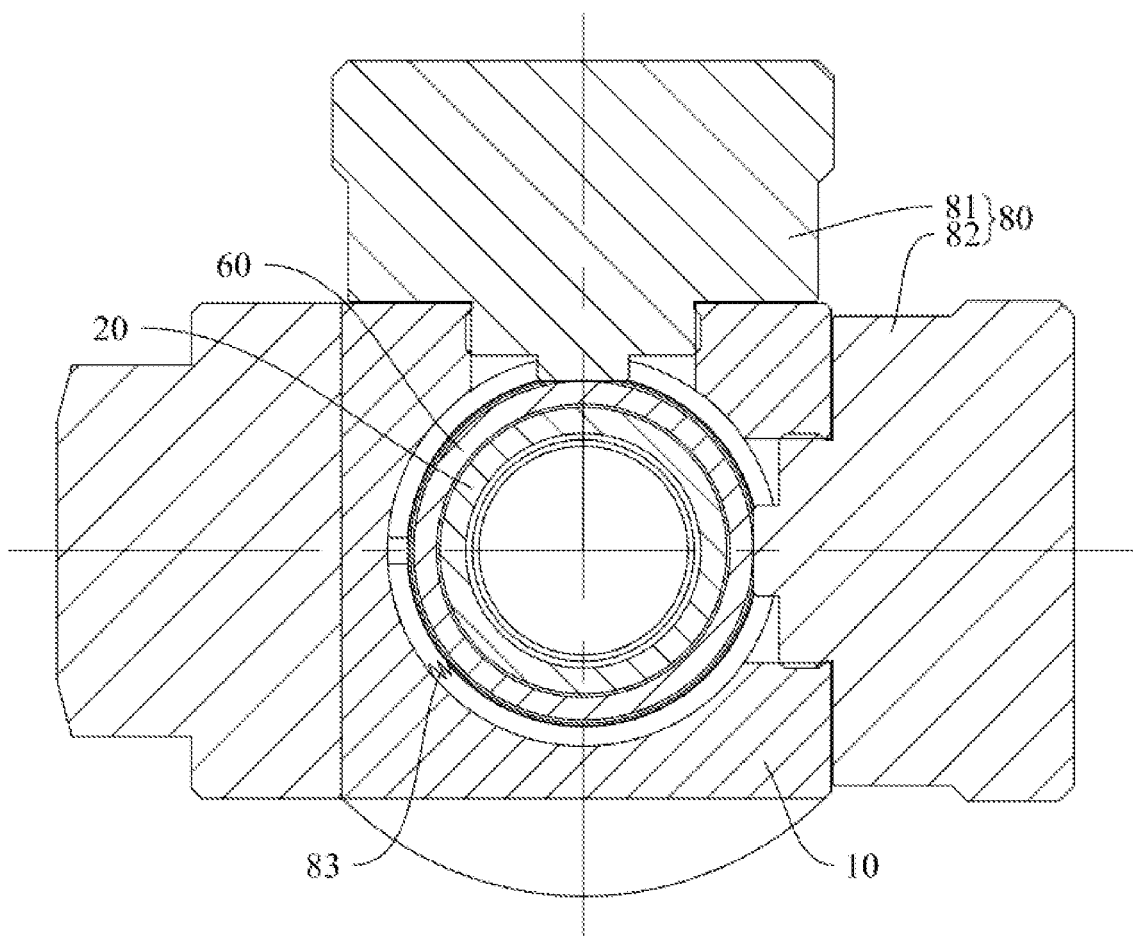
FIG. 8 is a schematic view illustrating cooperation between an adjustment mechanism, a sight body, an inner tube, and an outer tube according to Embodiment 2 of the present application.

The embodiment differs from Embodiment 1 in:

Referring to FIG. 5, FIG. 6, and FIG. 8, in some embodiments of the present application, ball head 62 is provided convexly at a circumferential side of an end of the outer tube 60 close to the eye side. Ball socket 11 is provided concavely on an inner wall of the sight body 10. The ball head 62 is hinged to the ball socket 11. The zoom sight further includes adjustment mechanism 80 provided at an end of the outer tube 60 away from the eye side. The adjustment mechanism 80 is configured to drive the outer tube 60 to rotate around a center of the ball socket 11.

It is to be noted that the ball head 62 of the outer tube 60 is hinged to the ball socket 11 of the sight body 10, and cannot be separated from the ball socket 11. Upon this, when the end of the outer tube 60 away from the eye side is stressed, the outer tube 60 can rotate around the center of the ball socket 11 stably and reliably for a certain amplitude.

Penetrating through the sight body 10, and provided at the end of the outer tube 60 away from the eye side, the adjustment mechanism 80 can be configured to apply an acting force to the end of the outer tube 60 away from the eye side, so as to drive the outer tube 60 to rotate round the center of the ball socket 11 for a controllable amplitude. This can align an optical axis conveniently and controllably to realize adjustment and gun calibration, thereby effectively eliminating an assembly error, and effectively ensuring and improving an aiming accuracy of the zoom sight.

Both the adjustment and the gun calibration are not interfered with the zoom operation.

There are no limits made on a specific structure of the adjustment mechanism 80 in the embodiment. Exemplarily, as shown in FIG. 8, in a possible implementation, the adjustment mechanism 80 includes ballistic adjustment assembly 81, windage adjustment assembly 82, and restoration structure 83. The ballistic adjustment assembly 81 is provided at a side of the outer tube 60 along a vertical direction. The windage adjustment assembly 82 is provided at a side of the outer tube 60 along a horizontal direction. An included angle between the restoration structure 83 and the ballistic adjustment assembly 81 is the same as an included angle between the restoration structure 83 and the windage adjustment assembly 82. When the ballistic adjustment assembly 81 applies a vertical acting force to the end of the outer tube 60 away from the eye side, the outer tube 60 can swing vertically around the center of the ball socket 11 under the vertical acting force of the ballistic adjustment assembly 81 to realize accurate adjustment on a ballistic compensation distance, and accurate adjustment on vertical positions of the aiming point and the optical axis. When the windage adjustment assembly 82 applies a horizontal acting force to the end of the outer tube 60 away from the eye side, the outer tube 60 can swing horizontally around the center of the ball socket 11 under the horizontal acting force of the windage adjustment assembly 82 to realize accurate adjustment on a windage compensation distance, and accurate adjustment on horizontal positions of the aiming point and the optical axis. The restoration structure 83 can apply a balanced acting force to the end of the outer tube 60 away from the eye side. A direction of the balanced acting force is reverse to a direction of a resultant force for the vertical acting force and the horizontal acting force, such that the outer tube 60 maintains an adjusted state stably. The restoration structure 83 may be, but is not limited to, a shrapnel or a spring.

Referring to FIG. 8, in another possible implementation, the adjustment mechanism 80 includes ballistic adjustment assembly 81, windage adjustment assembly 82, and two restoration structures 83 respectively corresponding to the ballistic adjustment assembly 81 and the windage adjustment assembly 82. The ballistic adjustment assembly 81 is provided at a side of the outer tube 60 along a vertical direction. The windage adjustment assembly 82 is provided at a side of the outer tube 60 along a horizontal direction. When the ballistic adjustment assembly 81 applies a vertical acting force to the end of the outer tube 60 away from the eye side, the outer tube 60 can swing vertically around the center of the ball socket 11 under the vertical acting force of the ballistic adjustment assembly 81. Meanwhile, the restoration structure 83 corresponding to the ballistic adjustment assembly 81 can correspondingly feed a vertical balanced force reverse to the vertical acting force, such that the outer tube 60 maintains an adjusted state stably, thereby realizing accurate adjustment on a ballistic compensation distance, and accurate adjustment on vertical positions of the aiming point and the optical axis. When the windage adjustment assembly 82 applies a horizontal acting force to the end of the outer tube 60 away from the eye side, the outer tube 60 can swing horizontally around the center of the ball socket 11 under the horizontal acting force of the windage adjustment assembly 82. Meanwhile, the restoration structure 83 corresponding to the windage adjustment assembly 82 can correspondingly feed a horizontal balanced force reverse to the horizontal acting force, such that the outer tube 60 maintains an adjusted state stably, thereby realizing accurate adjustment on a windage compensation distance, and accurate adjustment on horizontal positions of the aiming point and the optical axis. The restoration structure 83 may be, but is not limited to, a shrapnel or a spring.

Referring to FIG. 5 and FIG. 6, in some embodiments of the present application, flange 22 is provided convexly at a circumferential side of the end of the inner tube 20 close to the eye side. The flange 22 and the ball head 62 are spliced into an intact ball head 62 structure, and collectively hinged to the ball socket 11.

It is to be noted that the ball head 62 of the outer tube 60 serves as one part of the ball head 62 structure, and the ball head 62 of the inner tube 20 serves as the other part of the ball head 62 structure. The flange 22 and the ball head 62 can be spliced into the intact ball head 62 structure, and collectively hinged to the ball socket 11 of the sight body 10. The flange 22 and the ball head 62 cannot be separated from the ball socket 11. When the end of the outer tube 60 away from the eye side is stressed, the outer tube 60 and the inner tube 20 can rotate around the center of the ball socket 11 stably and reliably for a certain amplitude. This can also facilitate the adjustment and the gun calibration.

Referring to FIG. 5 and FIG. 6, in some embodiments of the present application, the zoom sight further includes compression ring 90 provided in the sight body 10 and connected to the sight body 10. The compression ring 90 compresses the flange 22, to prevent the flange 22 and the ball head 62 from being separated from the ball socket 11. There are no limits made on a connection manner between the compression ring 90 and the sight body 10 in the embodiment.

It is to be noted that based on the above embodiment, the flange 22 can be compressed and limited by the compression ring 90 connected to the sight body 10, and the ball head 62 is pressed and limited through the flange 22, thereby reliably preventing the flange 22 and the ball head 62 from being separated from the ball socket 11. Meanwhile, since the compression ring 90 compresses and limits the flange 22 and the ball head 62 in the ball socket 11, the axial position of the inner tube 20 relative to the sight body 10 and the axial position of the outer tube 60 relative to the sight body 10 can further be effectively stabilized, the inner tube 20 can be effectively forbidden to move along the axial direction of the sight body 10, and the outer tube 60 is forbidden to move along the axial direction of the sight body 10. Meanwhile, compression and limitation of the compression ring 90 for the flange 22 and the ball head 62 do not affect rotation of the flange 22 and the ball head 62 in the ball socket 11, and do not affect the circumferential rotation of the inner tube 20 around the central axis of the inner tube.

Certainly, in other possible implementations, without affecting the rotation of the flange 22 and the ball head 62 in the ball socket 11, and without affecting the circumferential rotation of the inner tube 20 around the central axis of the inner tube, the flange 22 and the ball head 62 may also be limited in other manners to prevent the flange 22 and the ball head 62 from being separated from the ball socket 11. This is not limited in the embodiment.

In addition, optionally, through the retaining portion 64 convexly provided at the end of the outer tube 60 away from the eye side, the side of the end of the inner tube 20 away from the eye side can further be located and retained. This further stabilizes the axial position of the inner tube 20 relative to the outer tube 60, and further forbids the inner tube 20 to move along the axial direction of the outer tube 60.

Referring to FIG. 5 and FIG. 6, in some embodiments of the present application, rotation stopping groove 621 extending along an axial direction of the outer tube 60 is formed in an outer circumferential surface of the ball head 62. Second threaded hole 12 extending along a radial direction of the sight body and communicating with the rotation stopping groove 621 is formed in the sight body 10. The zoom sight further includes rotation stopping bolt 110 provided in the second threaded hole 12. A nail portion of the rotation stopping bolt 110 is stretched out of the second threaded hole 12 and limited in the rotation stopping groove 621, so as to forbid the circumferential rotation of the outer tube 60 around the central axis of the outer tube.

It is to be noted that the rotation stopping groove 621 is formed in the outer circumferential surface of the ball head 62, and the rotation stopping groove 621 extends along the axial direction of the outer tube 60. The second threaded hole 12 is formed in the sight body 10. The second threaded hole 12 extends along the radial direction of the sight body 10 and penetrates through the sight body 10. The second threaded hole 12 corresponds to and communicates with the rotation stopping groove 621. The rotation stopping bolt 110 can be screwed in from an outer orifice of the second threaded hole 12, until the nail portion of the rotation stopping bolt 110 is stretched out of an inner orifice of the second threaded hole 12 and limited in the rotation stopping groove 621. Based on limitation between the rotation stopping bolt 110 and the rotation stopping groove 621, the outer tube 60 is reliably forbidden to make the circumferential rotation around the central axis of the outer tube.

The outer tube 60 rotates around the center of the ball socket 11 for a small amplitude under the adjustment mechanism 80. While ensuring a stopping effect of the rotation stopping bolt 110, this can lower a risk of interference between the rotation stopping bolt 110 and the rotation stopping groove 621 during the rotation of the outer tube 60 around the center of the ball socket 11.

Referring to FIG. 5 and FIG. 6, in some embodiments of the present application, the nail portion of the rotation stopping bolt 110 abuts against two opposite walls of the rotation stopping groove 621.

It is to be noted that the nail portion of the rotation stopping bolt 110 abuts against the two opposite walls of the rotation stopping groove 621 by adjusting a size of the nail portion of the rotation stopping bolt 110. According to a shape of the nail portion of the rotation stopping bolt 110, the nail portion of the rotation stopping bolt 110 can come in a point contact or a line contact with each of the walls of the rotation stopping groove 621, and this is not limited in the embodiment.

With the above solution, by allowing the nail portion of the rotation stopping bolt 110 to abut against the two opposite walls of the rotation stopping groove 621, a fit clearance between the nail portion of the rotation stopping bolt 110 and each of the two opposite walls of the rotation stopping groove 621 can be eliminated. Upon this, the rotation stopping bolt 110 can reliably forbid the outer tube 60 to make the circumferential rotation along the central axis of the outer tube, thereby effectively lowering a risk that the outer tube 60 has a degree of freedom (DOF) of making the circumferential rotation along the central axis of the outer tube due to the fit clearance.

Referring to FIG. 5 and FIG. 6, in some embodiments of the present application, the outer tube 60 has radial plane 63 passing through the center of the ball socket 11 and perpendicular to a central axis of the sight body 10. A contact point or a contact line between the nail portion of the rotation stopping bolt 110 and each of the walls of the rotation stopping groove 621 is located on the radial plane 63.

It is to be noted that the radial plane 63 passes through the center of the ball socket 11 and is perpendicular to the central axis of the sight body 10. Even in the rotation of the outer tube 60 around the center of the ball socket 11 under the adjustment mechanism 80, a position and a state of the radial plane 63 relative to the sight body 10 also basically maintain unchanged.

Upon this, by maintaining the contact point or the contact line between the nail portion of the rotation stopping bolt 110 and the wall of the rotation stopping groove 621 on the radial plane 63, while a stopping effect of the rotation stopping bolt 110 is ensured, a risk of interference between the rotation stopping bolt 110 and the rotation stopping groove 621 during the rotation of the outer tube 60 around the center of the ball socket 11 can be lowered.

Figure 7:
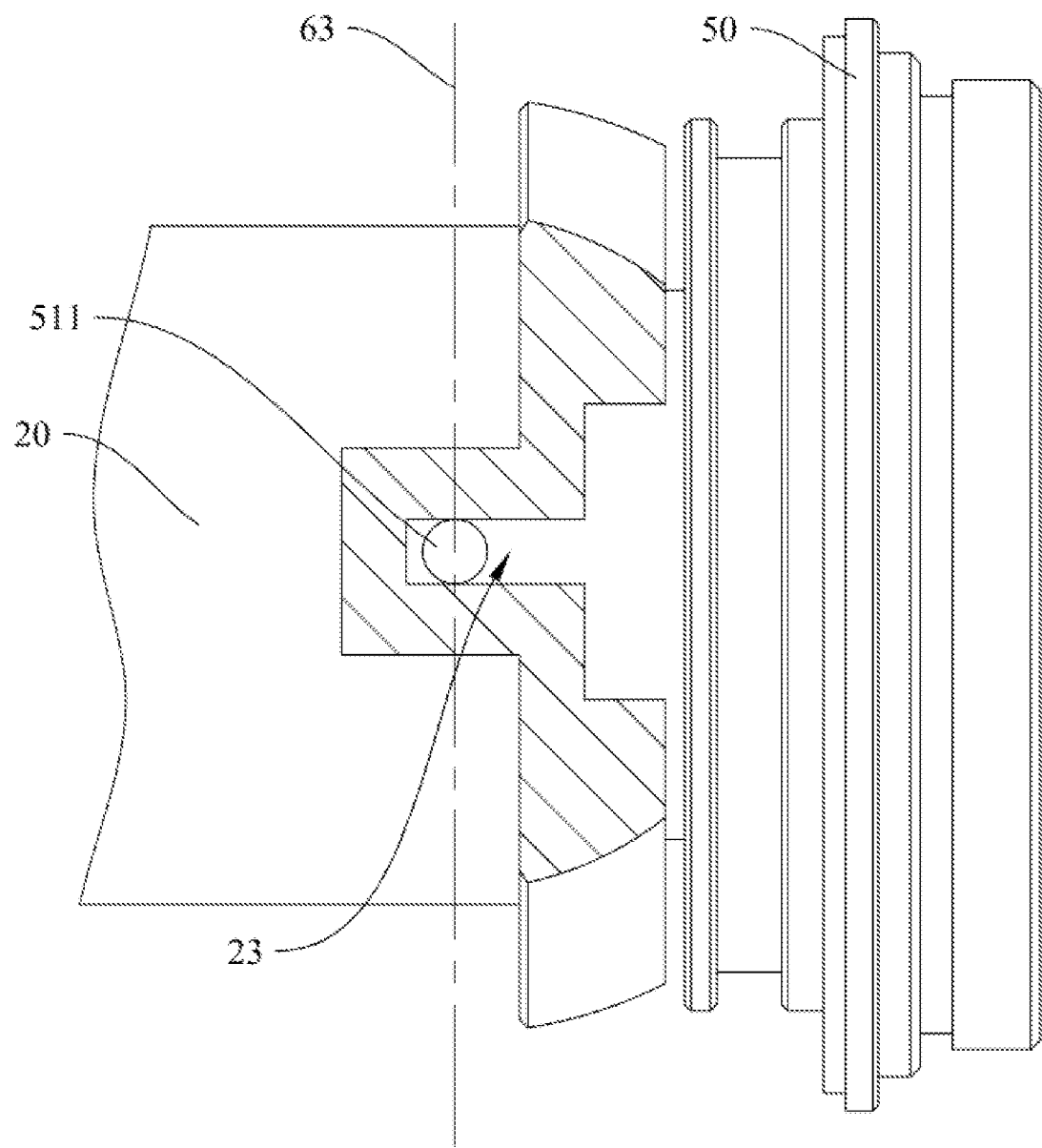
FIG. 7 is a schematic view illustrating cooperation between a protrusion and a limit groove according to Embodiment 2 of the present application.

Referring to FIG. 5, FIG. 6, and FIG. 7, in some embodiments of the present application, the drive member 50 is provided with drive barrel 51 nested in the inner tube 20. Protrusion 511 is provided convexly on an outer surface of the drive barrel 51. Inner tube 20 wall of the inner tube 20 is provided with axially extending limit groove 23. An end of the limit groove 23 close to the eye side communicates with the outside of the inner tube 20. The protrusion 511 is limited in the limit groove 23. The protrusion 511 abuts against two opposite walls of the limit groove 23. The outer tube 60 has radial plane 63 passing through the center of the ball socket 11 and perpendicular to the central axis of the sight body 10. A contact point or a contact line between the protrusion 511 and each of the walls of the limit groove 23 is located on the radial plane 63.

It is to be noted that an end of the drive member 50 connected to the inner tube 20 is provided with the drive barrel 51, and the drive barrel 51 can be nested in the end of the inner tube 20 close to the eye side. The protrusion 511 is provided convexly on the outer surface of the drive barrel 51, and the inner tube 20 wall of the inner tube 20 is correspondingly provided with the limit groove 23. When the drive barrel 51 is nested in the inner tube 20, the protrusion 511 can slide to the limit groove 23 from the end of the limit groove 23 close to the eye side, and is finally limited in the limit groove 23. This can realize detachable connection between the drive member 50 and the inner tube 20 conveniently, quickly and reliably, and can make the connected drive member 50 and inner tube 20 maintaining the synchronous circumferential rotation. Therefore, when the eyepiece set 40 is rotated circumferentially by the user to drive the drive member 50 to make the synchronous circumferential rotation, the drive member 50 can drive the inner tube 20 reliably to make the synchronous circumferential rotation through limitation between the protrusion 511 and the limit groove 23, thereby driving the zoom lens set 30 to move along the axial direction of the inner tube 20 to realize the zoom operation.

There may be one or more limit grooves 23 along a circumferential direction of the inner tube 20 wall of the inner tube 20. Each limit groove 23 can correspondingly limit one protrusion 511. This is not limited in the embodiment. Preferably, in response to a plurality of limit grooves 23, the plurality of limit grooves 23 are arrayed along the circumferential direction of the inner tube 20 wall of the inner tube 20. This can equalize and optimize a distribution at a junction between the drive barrel 51 and the inner tube 20, thereby equalizing an acting force between the drive barrel 51 and the inner tube 20, and improving a connection reliability and a connection strength between the drive barrel 51 and the inner tube 20.

The protrusion 511 may be, but is not limited to, a circular cylinder, a polygonal cylinder, and a hemispheroid. This is not limited in the embodiment.

It is further to be noted that the protrusion 511 abuts against the two opposite walls of the limit groove 23. Upon this, a fit clearance between the protrusion 511 and each of the two opposite walls of the limit groove 23 can be eliminated. Therefore, in response to the circumferential rotation of the drive member 50, the drive member 50 can directly drive the inner tube 20 to make the synchronous circumferential rotation through the limitation between the protrusion 511 and the limit groove 23, without compensating the fit clearance between the protrusion 511 and each of the two opposite walls of the limit groove 23. This can ensure and improve rotation synchronism between the drive member 50 and the inner tube 20, and can ensure and improve a zoom adjustment accuracy.

The protrusion 511 can come in a point contact or a line contact with the wall of the limit groove 23. For example, when the protrusion 511 is a circular cylinder, an outer circumferential surface of the protrusion 511 can come in the line contact with the wall of the limit groove 23. When the protrusion 511 is a square body, an edge of the protrusion 511 can come in the line contact with the wall of the limit groove 23.

It is further to be noted that the radial plane 63 passes through the center of the ball socket 11 and is perpendicular to the central axis of the sight body 10. Even in the rotation of the outer tube 60 around the center of the ball socket 11 under the adjustment mechanism 80, a position and a state of the radial plane 63 relative to the sight body 10 are also basically maintain unchanged.

Upon this, by maintaining the contact point or the contact line between the protrusion 511 and the wall of the limit groove 23 on the radial plane 63, while the protrusion 511 drives the inner tube 20 and the drive member 50 to make the synchronous circumferential rotation, a risk of interference between components and particularly between the drive member 50 and the inner tube 20 during the rotation of the outer tube 60 around the center of the ball socket 11 can be lowered.

Embodiment 3

Figure 9:
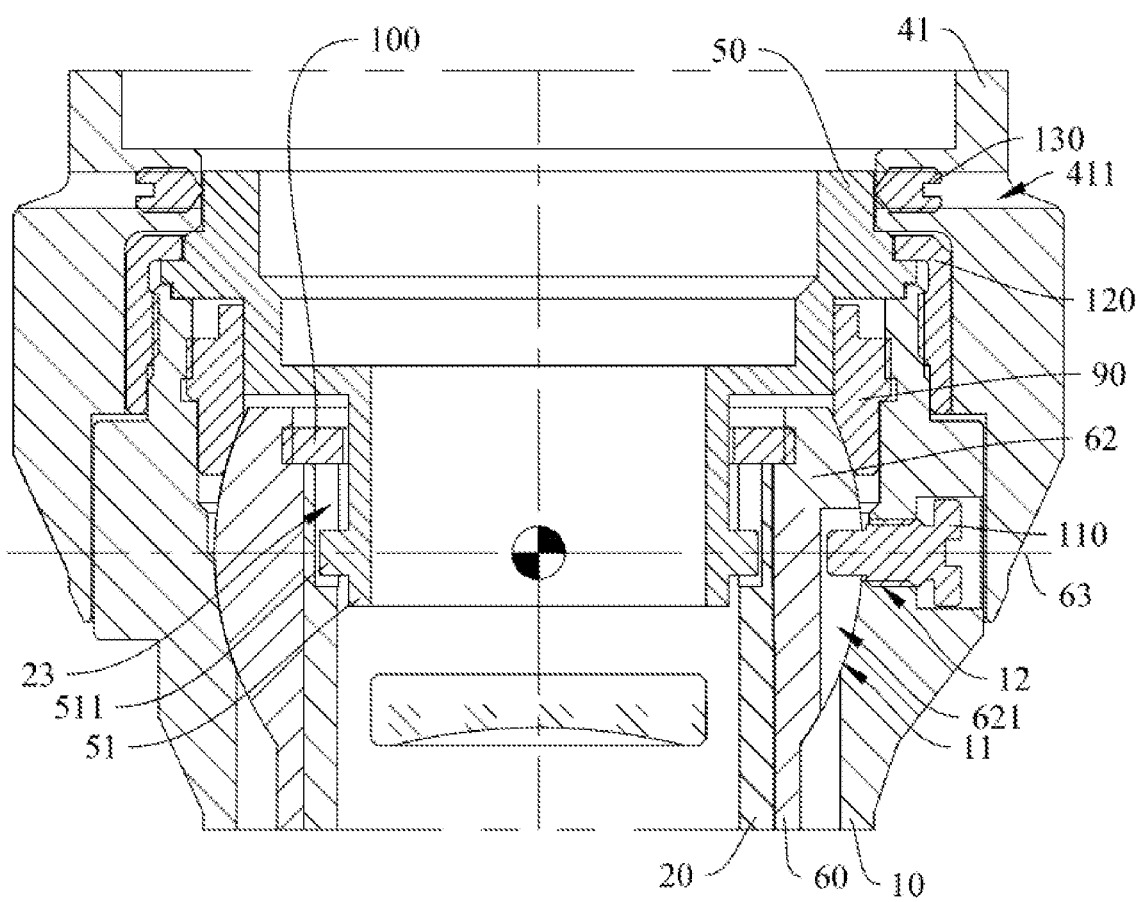
FIG. 9 is a structural schematic view of a zoom sight according to Embodiment 3 of the present application.

The embodiment differs from Embodiment 2 in:

Referring to FIG. 9, in some embodiments of the present application, the end of the inner tube 20 close to the eye side does not protrude out of the outer tube 60. The ball head 62 is an intact ball head 62 structure, and is independently hinged to the ball socket 11.

It is to be noted that the end of the inner tube 20 close to the eye side does not protrude out of the outer tube 60, namely this end is located in the outer tube 60. The ball head 62 of the outer tube 60 is the intact ball head 62 structure, and is independently hinged to the ball socket 11. The ball head 62 cannot be separated from the ball socket 11. When the end of the outer tube 60 away from the eye side is stressed, the outer tube 60 can rotate around the center of the ball socket 11 stably and reliably for a certain amplitude. This can also facilitate the adjustment and the gun calibration.

Referring to FIG. 9, in some embodiments of the present application, the zoom sight further includes compression ring 90 provided in the sight body 10 and connected to the sight body 10, and second retaining ring 100 provided in the outer tube 60 and connected to the outer tube 60. The compression ring 90 compresses the ball head 62, to prevent the ball head 62 from being separated from the ball socket 11. The second retaining ring 100 is retained at the side of the end of the inner tube 20 close to the eye side.

It is to be noted that based on the above embodiment, the ball head 62 independently hinged to the ball socket 11 can be compressed and limited by the compression ring 90 connected to the sight body 10, thereby reliably preventing the ball head 62 from being separated from the ball socket 11. Meanwhile, since the compression ring 90 compresses and limits the ball head 62 in the ball socket 11, the axial position of the outer tube 60 relative to the sight body 10 can further effectively stabilized, and the outer tube 60 can be effectively forbidden to move along the axial direction of the sight body 10. Meanwhile, limitation of the compression ring 90 for the ball head 62 does not affect rotation of the ball head 62 in the ball socket 11. There are no limits made on a connection manner between the compression ring 90 and the sight body 10 in the embodiment.

Based on the above embodiment, the second retaining ring 100 connected to the outer tube 60 can further locate and retain the side of the end of the inner tube 20 close to the eye side, thereby forbidding the inner tube 20 reliably to move close to the eye side. Thus, in cooperation with a limit structure at the side of the end of the inner tube 20 away from the eye side (for example, the retaining portion 64), the second retaining ring stabilizes the axial position of the inner tube 20 relative to the outer tube 60 reliably, thereby forbidding the inner tube 20 reliably to move along the axial direction of the outer tube 60. Moreover, location and retention of the first retaining ring 70 for the side of the end of the inner tube 20 close to the eye side does not affect the circumferential rotation of the inner tube 20 around the central axis of the inner tube. There are no limits made on a connection manner between the second retaining ring 100 and the sight body 10 in the embodiment. For example, threaded connection may be used.

Certainly, in other possible implementations, without affecting the rotation of the ball head 62 in the ball socket 11, the ball head 62 may also be limited in other manners to prevent the ball head 62 from being separated from the ball socket 11. Without affecting the circumferential rotation of the inner tube 20 around the central axis of the inner tube, the side of the end of the inner tube 20 close to the eye side may also be limited and located in other manners. This is not limited in the embodiment.

The above described are merely preferred embodiments of the present application, and are not intended to limit the present application. Any modification, equivalent substitution, improvement, and the like without departing from the spirit and principle of the present application should fall within the protection scope of the present application.

What is claimed is:
1. A zoom sight, comprising:
a sight body;
an inner tube provided in the sight body, and capable of making circumferential rotation around a central axis of the inner tube, an axial position of the inner tube relative to the sight body being stable;
a zoom lens set provided in the inner tube, and linked with the inner tube, wherein the inner tube in the circumferential rotation drives the zoom lens set to move along an axial direction of the inner tube;

an eyepiece set provided at an end of the sight body close to an eye side; and a drive member connected between the inner tube and the eyepiece set, the drive member, the eyepiece set, and the inner tube maintain synchronous circumferential rotation.

2. The zoom sight according to claim 1, wherein the zoom sight further comprises an outer tube; the outer tube is provided in the sight body and outside the inner tube; and the outer tube has a stable axial position relative to the sight body, and is forbidden to make circumferential rotation around a central axis of the outer tube;

a wall of one of the outer tube and the inner tube is provided with a curved groove extending spirally and penetrating through the wall; and a wall of the other of the outer tube and the inner tube is provided with a linear groove extending along an axial direction of the wall and penetrating through the wall; and the zoom lens set is provided with a slider; and the slider is slidably connected to the curved groove and the linear groove.

3. The zoom sight according to claim 2, wherein the outer tube is fixedly connected to the sight body; and the zoom sight further comprises a first retaining ring provided in the sight body and connected to the sight body; and the first retaining ring is retained at a side of an end of the inner tube close to the eye side.

4. The zoom sight according to claim 2, wherein a ball head is provided convexly at a circumferential side of an end of the outer tube close to the eye side; a ball socket is provided concavely on an inner wall of the sight body; and the ball head is hinged to the ball socket; and the zoom sight further comprises an adjustment mechanism provided at an end of the outer tube away from the eye side; and the adjustment mechanism is configured to drive the outer tube to rotate around a center of the ball socket.

5. The zoom sight according to claim 4, wherein a flange is provided convexly at a circumferential side of an end of the inner tube close to the eye side; and the flange and the ball head are spliced into an intact ball head structure, and collectively hinged to the ball socket; and the zoom sight further comprises a compression ring provided in the sight body and connected to the sight body; and the compression ring compresses the flange, to prevent the flange and the ball head from being separated from the ball socket.

6. The zoom sight according to claim 4, wherein an end of the inner tube close to the eye side does not protrude out of the outer tube; and the ball head is an intact ball head structure, and is independently hinged to the ball socket; and the zoom sight further comprises a compression ring provided in the sight body and connected to the sight body, and a second retaining ring provided in the outer tube and connected to the outer tube; the compression ring compresses the ball head, to prevent the ball head from being separated from the ball socket; and the second retaining ring is retained at a side of the end of the inner tube close to the eye side.

7. The zoom sight according to claim 4, wherein a rotation stopping groove extending along an axial direction of the outer tube is formed in an outer circumferential surface of the ball head; a second threaded hole extending along a radial direction of the sight body and communicating with the rotation stopping groove is formed in the sight body; the zoom sight further comprises a rotation stopping bolt provided in the second threaded hole; and a nail portion of the rotation stopping bolt is stretched out of the second threaded hole and limited in the rotation stopping groove, so as to forbid the circumferential rotation of the outer tube around the central axis of the outer tube.

8. The zoom sight according to claim 7, wherein the nail portion of the rotation stopping bolt abuts against two opposite walls of the rotation stopping groove; and the outer tube has a radial plane passing through the center of the ball socket and perpendicular to a central axis of the sight body; and a contact point or a contact line between the nail portion of the rotation stopping bolt and each of the walls of the rotation stopping groove is located on the radial plane.

9. The zoom sight according to claim 2, wherein the end of the outer tube away from the eye side is provided with a retaining portion; and the retaining portion is retained at a side of an end of the inner tube away from the eye side.

10. The zoom sight according to claim 1, wherein the drive member is provided with a drive barrel nested in the inner tube; a protrusion is provided convexly on an outer surface of the drive barrel; an inner tube wall of the inner tube is provided with an axially extending limit groove; an end of the limit groove close to the eye side communicates with the outside of the inner tube; and the protrusion is limited in the limit groove; and the protrusion abuts against two opposite walls of the limit groove.

11. The zoom sight according to claim 5, wherein the drive member is provided with a drive barrel nested in the inner tube; a protrusion is provided convexly on an outer surface of the drive barrel; an inner tube wall of the inner tube is provided with an axially extending limit groove; an end of the limit groove close to the eye side communicates with the outside of the inner tube; the protrusion is limited in the limit groove; and the protrusion abuts against two opposite walls of the limit groove; and the outer tube has a radial plane passing through the center of the ball socket and perpendicular to the central axis of the sight body; and a contact point or a contact line between the protrusion and each of the walls of the limit groove is located on the radial plane.

12. The zoom sight according to claim 1, wherein the zoom sight further comprises a locking pressure ring connected to the end of the sight body close to the eye side; and the locking pressure ring presses the drive member to a side of the end of the sight body close to the eye side, such that an axial position of the drive member relative to the sight body is stable.

13. The zoom sight according to claim 1, wherein the eyepiece set comprises a barrel connected to the drive member; the barrel is sleeved on an outer side of the drive member; an outer surface of the barrel is provided with a radially penetrating first threaded hole; the zoom sight further comprises a synchronization bolt provided in the first threaded hole; and the synchronization bolt abuts against the drive member, such that the barrel and the drive member maintain synchronous circumferential rotation.

* * * * *